United States Patent
Spencer

(10) Patent No.: US 8,699,316 B2
(45) Date of Patent: Apr. 15, 2014

(54) USF CODING

(75) Inventor: Paul S. Spencer, Modiin (IL)

(73) Assignee: Marvell World Trade Ltd., St. Michael (BB)

( * ) Notice: Subject to any disclaimer, the term of this patent is extended or adjusted under 35 U.S.C. 154(b) by 1208 days.

(21) Appl. No.: 12/053,385

(22) Filed: Mar. 21, 2008

(65) Prior Publication Data

US 2008/0311918 A1    Dec. 18, 2008

Related U.S. Application Data

(60) Provisional application No. 60/896,023, filed on Mar. 21, 2007, provisional application No. 60/896,115, filed on Mar. 21, 2007, provisional application No. 60/912,560, filed on Apr. 18, 2007, provisional application No. 60/943,960, filed on Jun. 14, 2007.

(51) Int. Cl.
*H04J 9/00* (2006.01)

(52) U.S. Cl.
USPC .......................... 370/204; 370/329; 375/261

(58) Field of Classification Search
USPC .......................................... 370/329, 335, 348
See application file for complete search history.

(56) References Cited

U.S. PATENT DOCUMENTS

| | | | | | |
|---|---|---|---|---|---|
| 5,914,959 | A | * | 6/1999 | Marchetto et al. | 370/468 |
| 5,960,041 | A | * | 9/1999 | Calderbank et al. | 375/292 |
| 5,968,198 | A | * | 10/1999 | Hassan et al. | 714/752 |
| 6,259,744 | B1 | * | 7/2001 | Lee et al. | 375/264 |
| 7,254,381 | B1 | * | 8/2007 | Beamish et al. | 455/334 |
| 2004/0233903 | A1 | * | 11/2004 | Samaras et al. | 370/389 |
| 2004/0253958 | A1 | * | 12/2004 | Chang et al. | 455/445 |
| 2005/0002465 | A1 | * | 1/2005 | Jeong | 375/261 |
| 2005/0008081 | A1 | * | 1/2005 | Yamazaki et al. | 375/259 |
| 2005/0053044 | A1 | * | 3/2005 | Alm et al. | 370/338 |
| 2006/0198371 | A1 | * | 9/2006 | Huang et al. | 370/389 |
| 2007/0297533 | A1 | * | 12/2007 | Chitrapu et al. | 375/308 |
| 2008/0253279 | A1 | * | 10/2008 | Ma et al. | 370/206 |
| 2009/0129502 | A1 | * | 5/2009 | Tong et al. | 375/299 |

FOREIGN PATENT DOCUMENTS

| | | |
|---|---|---|
| EP | 1 453 264 | 9/2004 |
| WO | WO 02/31985 | 4/2002 |
| WO | WO 02-31985 | 4/2002 |
| WO | WO 2006/021828 | 3/2006 |

OTHER PUBLICATIONS

"3GPP TR 45.912: Feasibility study for evolved GSM/EDGE Radio Access Network (GERAN)", Nov. 2006.*
International Search Report dated Apr. 15, 2009, Application No. PCT-IB2008-002881 (13 pages).
Ericsson, "Support for DL only SNF operation for MBMS FDD", 3GPP TSG-RAN WG1 Meeting #47bis, Tdoc R1-071085, St. Louis, USA, Feb. 12-16, 2007, 2 pages.
Universal Mobile Telecommunications Systems (UMTS); Multiplexing and channel coding (FDD) (3GPP TS 25.212 version 7.3.0 Release 7), ETSI TS 125 212, pp. 1-85, Dec. 2006.

* cited by examiner

*Primary Examiner* — Brandon Renner
*Assistant Examiner* — Scott M Sciacca

(57) ABSTRACT

Systems and methods are provided for transmitting and receiving an uplink state flag (USF) in a cellular network. A base station may transmit the USF to plurality of mobile stations that share the same frequency channel, and each mobile station can use the USF to determine whether that mobile station can transmit data in an upcoming uplink time period. The base station can encode the USF bits into a plurality of encoded USF symbols, where the encoded USF symbols may be selected from corner signal points in a QAM signal constellation set or from signal points adjacent to the corners of a QAM signal constellation set. The base station can interleave the encoded USF symbols and modulate the encoded USF symbols for transmission using the signal constellation set. A mobile station that can communication with the base station can include a corresponding receiver, de-interleaver, and decoder.

17 Claims, 12 Drawing Sheets

Table 1A: USF symbol encoding table - 12 symbols – RED HOT A

| USF value | Burst 1 | Burst 2 | Burst 3 | Burst 4 |
|---|---|---|---|---|
| 000 | 000 | 000 | 000 | 000 |
| 001 | 110 | 011 | 001 | 100 |
| 010 | 101 | 010 | 101 | 010 |
| 011 | 011 | 001 | 100 | 110 |
| 100 | 100 | 110 | 011 | 001 |
| 101 | 010 | 101 | 010 | 101 |
| 110 | 001 | 100 | 110 | 011 |
| 111 | 111 | 111 | 111 | 111 |

FIG. 4A

Table 1B: USF symbol encoding table - 16 symbols – RED HOT B

| USF value | Burst 1 | Burst 2 | Burst 3 | Burst 4 |
|---|---|---|---|---|
| 000 | 0000 | 0000 | 0000 | 0000 |
| 001 | 1100 | 1100 | 1100 | 1100 |
| 010 | 1010 | 1010 | 1010 | 1010 |
| 011 | 0110 | 0110 | 0110 | 0110 |
| 100 | 1001 | 1001 | 1001 | 1001 |
| 101 | 0101 | 0101 | 0101 | 0101 |
| 110 | 0011 | 0011 | 0011 | 0011 |
| 111 | 1111 | 1111 | 1111 | 1111 |

Table 2B: USF symbol encoding table - 16 symbols – EGPRS2-B DL

| USF value | Burst 1 | Burst 2 | Burst 3 | Burst 4 |
|---|---|---|---|---|
| 000 | 0000 | 0000 | 0000 | 0000 |
| 001 | 1111 | 0000 | 0011 | 1100 |
| 010 | 1100 | 1100 | 1100 | 1100 |
| 011 | 0011 | 1100 | 1111 | 0000 |
| 100 | 1100 | 0011 | 0000 | 1111 |
| 101 | 0011 | 0011 | 0011 | 0011 |
| 110 | 0000 | 1111 | 1100 | 0011 |
| 111 | 1111 | 1111 | 1111 | 1111 |

Table 2A: USF symbol encoding table – 12 symbols – EGPRS2-A DL

| USF value | Burst 1 | Burst 2 | Burst 3 | Burst 4 |
|---|---|---|---|---|
| 000 | 000 | 000 | 000 | 000 |
| 001 | 222 | 000 | 223 | 020 |
| 010 | 200 | 211 | 201 | 303 |
| 011 | 323 | 220 | 031 | 223 |
| 100 | 301 | 332 | 222 | 201 |
| 101 | 121 | 133 | 311 | 121 |
| 110 | 133 | 023 | 023 | 302 |
| 111 | 012 | 212 | 103 | 122 |

FIG. 5A

Table 3A: Burst Format for USF RED HOT

| Protocol | # Symbols | Symbol Position |
|---|---|---|
| RED HOT A | 12 | ({59},{60},{88}) |
| RED HOT B | 12 | ({70},{71},{103}) |
| RED HOT B | 16 | ({70},{71},{103},{104}) |

FIG. 6A

Table 3B: Burst Format for USF EGPRS2 DL

| Protocol | # Symbols | Symbol Position |
|---|---|---|
| EGPRS2-A DL | 12 | ({87},{88},{89}) |
| EGPRS2-B DL | 16 | ({104},{105},{106},{107}) |

FIG. 6B

USF CODING

CROSS-REFERENCE TO RELATED APPLICATIONS

This claims the benefit under 35 U.S.C. §119(e) of U.S. Provisional Application Nos. 60/896,023, filed Mar. 21, 2007, 60/896,115, filed Mar. 21, 2007, 60/912,560, filed Apr. 18, 2007, and 60/943,960, filed Jun. 14, 2007, which are hereby incorporated by reference herein in their entirety.

BACKGROUND OF THE INVENTION

The disclosed technology relates generally to cellular networks, and more particularly to transmitting and receiving uplink state flag (USF) information using the cellular network.

Cellular telephones have become an increasingly popular communications tool. To support cellular communication, cellular networks provide a plurality of base stations that can each transmit and receive information to and from multiple cellular telephones over wireless channels. However, available physical communication resources may be limited, and therefore the multiple cellular telephones may need to communicate with the base station using the same frequency channel. Various cellular protocols have been developed to allow multiple cellular telephones to share a physical resource. In some protocols, an uplink state flag (USF) that is transmitted by a base station is employed to schedule uplink traffic from a particular mobile station to the base station. Conventionally, USFs are strongly encoded and employ encoding schemes that are based on Hamming distance to ensure reliability.

SUMMARY OF THE INVENTION

Systems and methods are provided for transmitting scheduling information in the form of an uplink state flag (USF) from a base station to a mobile station, and for processing the USF at the mobile station.

A cellular network can include a plurality of base stations and a plurality of mobile stations. Each base station may be at a fixed location, and may communicate with mobile stations that are within radio communication range of that base station. A cellular telephone is one type of a mobile station. The region of radio coverage may be referred to as a radio cell. Each mobile station in a radio cell may be assigned a wireless channel to communicate with the base station.

Some of the mobile stations in the same radio cell may be assigned the same wireless channel by the base station, and the cellular network can grant access to the shared channel to one of the mobile stations at any given time. The base station can transmit uplink scheduling information to all of the mobile stations in the form of an uplink state flag (USF) as part of a downlink transmission. The USF may be, for example, three bits that can correspond to a three-bit identification code of one of the mobile stations. The USF can be transmitted along with other data (e.g., any suitable type of packet data) that may or may not be intended for the same mobile station that the three-bit identification code is associated with. With a three-bit identification code, the base station can allow seven mobile stations to share the same wireless channel, leaving an additional code that may be used to enable any of the mobile stations to transmit unscheduled requests. This unscheduled option may be referred to as a random access configuration.

To transmit network information, including the USF bits, to the mobile stations, the base station can include an encoder, a modulator, and a transmitter (e.g., a network interface and/or wireless antennas). In some embodiments, the base station can also include an interleaver. The encoder can include a USF encoder configured to convert the USF bits into a plurality of encoded USF symbols, referred to sometimes as a USF codeword. For example, the USF encoder can encode three USF bits into 12 or 16 encoded symbols. The symbols may each be of M bits, where M can be greater than one.

The USF encoder may employ a USF codebook. The codebook may specify the particular USF codeword that results from encoding a particular USF. Each USF codeword in the codebook may include a plurality of symbols, where each symbol in any of the possible USF codewords may correspond to a signal point that is located at or adjacent to a corner of a quadrature amplitude modulation (QAM) signal constellation set with $2^M$ signal points. The QAM signal constellation set may be, for example, a 16QAM or 32QAM signal set with 16 or 32 signal points, respectively. The corner or nearly corner signal points employed by the USF codebook may be selected from any suitable subset or set of available corner and/or nearly corner signal points in the QAM constellation set. For example, the USF encoder may encode a USF using the symbol values for two or more (e.g., 4, etc.) corner signal points and/or for two or more (e.g., 4, 8, 16, etc.) signal points that are adjacent to corners. As described in greater detail below, using corner or nearly signal points can provide added resiliency to noise when the USF codeword is transmitted.

The base station can include an interleaver that interleaves the encoded network information produced by the encoder. The encoded network information may be grouped into bursts, and the interleaver can spread the plurality of encoded USF symbols of the USF codeword evenly between the bursts. For example, the interleaver can spread 12 encoded USF symbols such that each of four bursts includes three of the encoded USF symbols.

The interleaved USF symbols may then be modulated by a modulator into radio signals capable of being transmitted to mobile stations. The modulator can modulate the interleaved USF symbols based on the QAM modulation scheme with $2^M$ signal points used by the USF encoder. Because corner signal points or signal points adjacent to corners are selected for use, as described above, the symbol values used by the USF encoder to encode the USF may correspond to signal points in the signal constellation set that are separated by a relatively large Euclidean distance compared to other pairs of signal points in the QAM signal set. In some embodiments, the symbol values may correspond to signal points located at antipodal locations in the QAM signal constellation set, which may be the signal points in the QAM signal constellation set furthest apart as possible from each other. Thus, as described above, with such a large Euclidean distance separating these signal values, the signal values can be more easily distinguished and interpreted by a mobile station receiving the radio signals, and therefore is more resilient to any noise that may occur during transmission.

One or more mobile stations may receive the radio signals transmitted by the base station. The mobile stations may interpret the signals to obtain, among other things, the uplink scheduling information included in the transmission. To interpret the radio signals received from the base station, a mobile station can include a receiver, a decoder, and sometimes a de-interleaver. Each of these components may be matched to their corresponding components in the base station. For example, the receiver may be matched to the transmitter and/or modulator, and can be configured to receive and demodulate the radio signal based on the same signal constellation set and modulation scheme. In some embodiments, the receiver may provide soft information for the transmitted bits or symbols in the form of, for example, a log-likelihood ratio (LLR) for each symbol. The de-interleaver may reorder the resulting soft information to return the symbols to their original order. The decoder can include a USF decoder that may recover an estimate of the USF based on the same codebook used by the USF encoder. That is, the USF decoder may employ a USF codebook that is defined by a subset of symbol values from the same QAM constellation set, where the subset is selected from among symbols values that each correspond to a signal point located at or adjacent to a corner of the QAM constellation set.

Each mobile station may use the USF estimate produced by its USF decoder to determine whether that mobile station has been granted access to the shared channel in an upcoming uplink time period. The mobile station may include hardware, software, or firmware-based computational logic to compare the USF estimate with a temporary identification assigned to the mobile station by the cellular network. If the USF estimate matches the temporary identification, the mobile station may transmit data on the next uplink time period. Otherwise, the mobile station does not transmit data on the next uplink time period, and allows another mobile station using the same channel to transmit information to the base station instead.

BRIEF DESCRIPTION OF THE DRAWINGS

The above and other aspects and advantages of the invention will be apparent upon consideration of the following detailed description, taken in conjunction with the accompanying drawings, in which like reference characters refer to like parts throughout, and in which:

FIG. 4A is a table showing an illustrative codebook for encoding a USF into 12 symbols using a constellation-corner encoding scheme in accordance with an embodiment of the present invention;

FIG. 4B is a table showing an illustrative codebook for encoding a USF into 16 symbols using a constellation-corner encoding scheme in accordance with an embodiment of the present invention;

FIG. 5A is a table showing an illustrative codebook for encoding a USF into 12 symbols using a constellation-corner encoding scheme in accordance with an embodiment of the present invention;

FIG. 5B is a table showing an illustrative codebook for encoding a USF into 16 symbols using a constellation-corner encoding scheme in accordance with an embodiment of the present invention;

FIGS. 6A and 6B are tables showing illustrative symbol positions of the encoded USF symbols for various protocols and symbol sizes in accordance with various embodiments of the present invention;

DETAILED DESCRIPTION OF THE INVENTION

Figure 1:
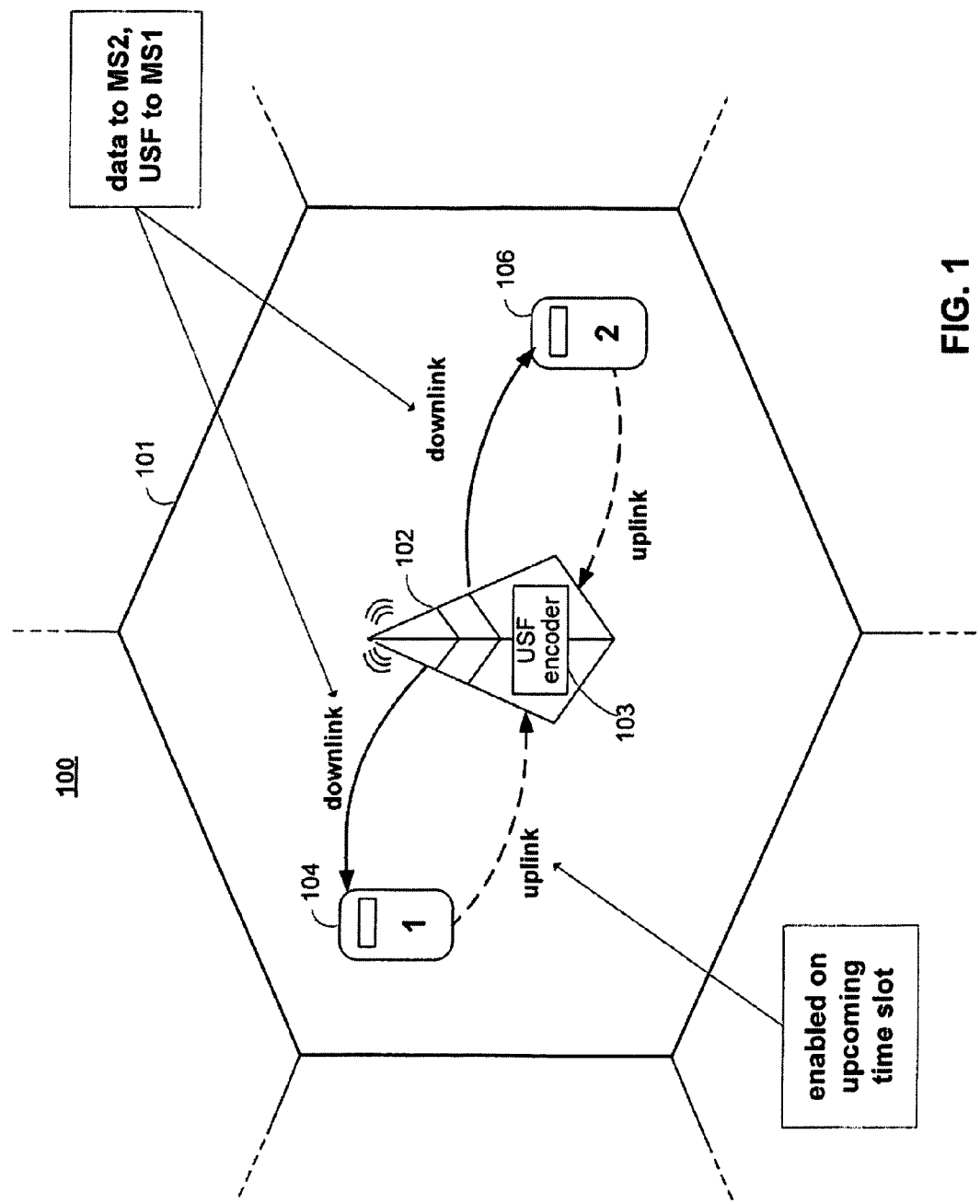
FIG. 1 is a simplified schematic diagram of one radio cell of a cellular network that includes a base station with a USF encoder employing the disclosed technology.

FIG. 1 shows an illustrative cellular system 100. Cellular system 100 can include a plurality of base stations that are interconnected to form a mobile or cellular network. For example, cellular system 100 can include base station 102. Base station 102 may be configured to communicate with mobile stations within its radio communication range via radio signals. Radio cell 101 may represent the physical area that lies within the radio communication range of base station 102.

Base station 102 may be able to communicate with mobile station 104 ("MS1") and mobile station 106 ("MS2"), which are both located within radio cell 101, and with other mobile stations that are also within radio cell 101 (not shown). For example, base station 102 may broadcast information to both mobile station 104 and 106, as well as to the other mobile station in range, and each of the mobile stations may be operable to transmit information to base station 102. Transmissions from base station 102 to mobile stations 104 and 106 may sometimes be referred to as downlink transmissions, while transmissions from mobile stations 104 and 106 to base station 102 may sometimes be referred to as uplink transmissions.

Mobile station 104 and mobile station 106 may be any suitable type of cellular telephones compatible with the mobile network of cellular system 100. For example, mobile stations 104 and 106 can operate based on a protocol or communications standard compatible with base station 102. In some embodiments, the mobile network may use the EGPRS2 Downlink ("DL") protocol. The EGPRS2 DL protocol may define, for example, various coding and modulation properties that allow cellular communication to occur reliably and at a high data rate. In some embodiments, using a version of the EGPRS2 DL protocol referred to sometimes as EGPRS2 Downlink Level A ("EGPRS2-A DL"), communication between base station 102 and mobile stations 104 and 106 may occur at a data rate of 270.8 kilosymbols/second (ksym/sec) (e.g., the legacy symbol rate (LSR) for the EGPRS2 DL protocol). In other embodiments, the mobile network may operate using a different version of the EGPRS2 Downlink protocol known sometimes as EGPRS2 Downlink Level B ("EGPRS2-B DL"), which specifies cellular transmissions at 325 ksym/sec (or 1.2 times the legacy rate). This higher data rate may be referred to as the high symbol rate (HSR) for the EGPRS2 DL protocol.

In other embodiments, the mobile network illustrated in FIG. 1 can employ a protocol other than a EGPRS2 DL protocol, such as a modified form of the EGPRS2 DL protocol. For example, the mobile network may employ a modified protocol that may sometimes be referred to as the Reduced symbol Duration, Higher Order modulation and Turbo codes (RED HOT) protocol. Like the EGPRS2 DL protocols, RED HOT may have two versions—RED HOT A and RED HOT B, which operate using the legacy and higher symbol rates described above, respectively.

To communicate with the mobile network, both mobile stations 104 and 106 may need to transmit information to base station 102. However, mobile stations 104 and 106 may operate using the same communications channel, as allocated by the mobile network. For example, mobile stations 104 and 106 may transmit radio signals to base station 102 that occupy the same frequency range. In accordance with some cellular telephone communications protocols, in order for base station 102 to be able to interpret the information contained within that shared frequency range, only one of these mobile stations may transmit data at a given time.

The mobile network may thus schedule uplink transmissions among mobile stations that share the same channel (e.g., mobile stations 104 and 106) so that only one of the mobile stations is permitted to transmit data to base station 102 at any given time. The mobile network may divide transmission time into time blocks/periods and allocate each uplink time block to one of these mobile stations, allowing that one mobile station to transmit data to base station 102 during the uplink time block. In some embodiments, to distinguish between the various mobile stations, the mobile network may assign each mobile station a different temporary identification. At each time block, the mobile network may direct base station 102 to broadcast one of the temporary identifications to all of the mobile stations in range that share the same physical resource (e.g., frequency channel). The mobile station matching the transmitted temporary identification may then transmit data to base station 102 on the uplink in the next time block or in a predetermined sequence of upcoming time blocks. The flag transmitted from base station 102 that corresponds to a mobile station's temporary identification may be referred to as an uplink state flag (USF), and is indicative of a schedule for a forthcoming uplink.

Base station 102 may transmit the USF along with other data intended for a particular mobile station. The data and the USF may be decoupled from one another. That is, the data may be intended for one mobile station while the USF grants a different mobile station access to the shared resource in an upcoming uplink block/period. For the example illustrated in FIG. 1, in the current downlink transmission, base station 102 may broadcast signals that are received by both mobile station 104 and mobile station (as well as any other mobile stations in radio cell 101), where the data is intended for mobile station 106 (MS2), but the uplink state flag corresponds to the temporary identification of mobile station (MS1).

To effectively transmit uplink state flags to mobile stations in radio cell 101 (e.g., MS1 and MS2), base station 102 can include USF encoder 103. USF encoder 103 may embody the encoding that base station 102 performs on the USF prior to transmission. To ensure transmission reliability, USF encoder 103 may strongly encode the USF. To provide additional reliability compared to prior cellular systems, USF encoder 103 may operate based on a constellation-corner-based encoding scheme rather than a conventional Hamming-distance based scheme. Examples of constellation-corner-based encoding schemes that may be employed by base station 102 are described in greater detail below in connection with FIGS. 7A, 7B, 8A and 8B.

Figure 2:
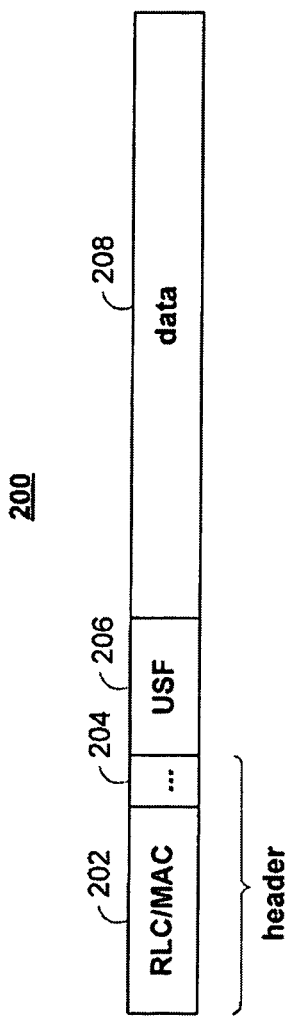
FIG. 2 is a simplified schematic of network information that can include USF information and can be encoded using a constellation-corner-based encoding scheme.

FIG. 2 shows an illustrative schematic diagram of the information that a base station (e.g., base station 102) may transmit on a downlink. The information transmitted by a base station may sometimes be referred to as network information. Network information 200 can include data 208, USF 206, and a header. Data 208 may be any suitable information intended for one or more mobile stations, such as packet data from another telephone. The header may include any necessary information that allows the one or mobile stations to interpret data 208. For example, the header can include radio link control/medium access control (RLC/MAC) header 202 and other header information 204. RLC/MAC header 202, for example, may set the communication protocol used for the downlink transmission.

USF 206 may be the uplink state flag that is encoded by USF encoder 103 of FIG. 1. That is, USF 206 may be the flag that gives one of the mobile stations in radio cell 101 (e.g., mobile stations 104 or 106) the permission to transmit on one or more upcoming uplink time periods. USF 206 in a downlink transmission may or may not be intended for the same mobile station which data 208 is intended. In some embodiments, USF 206 may be composed of three bits. In this scenario, each mobile station may have a temporary identification of three bits, which would allow $2^3-1=7$ mobile stations to share the same channel (e.g., frequency channel) in a particular radio cell, where the remaining USF combination may be reserved for the random access network configuration.

Figure 3:
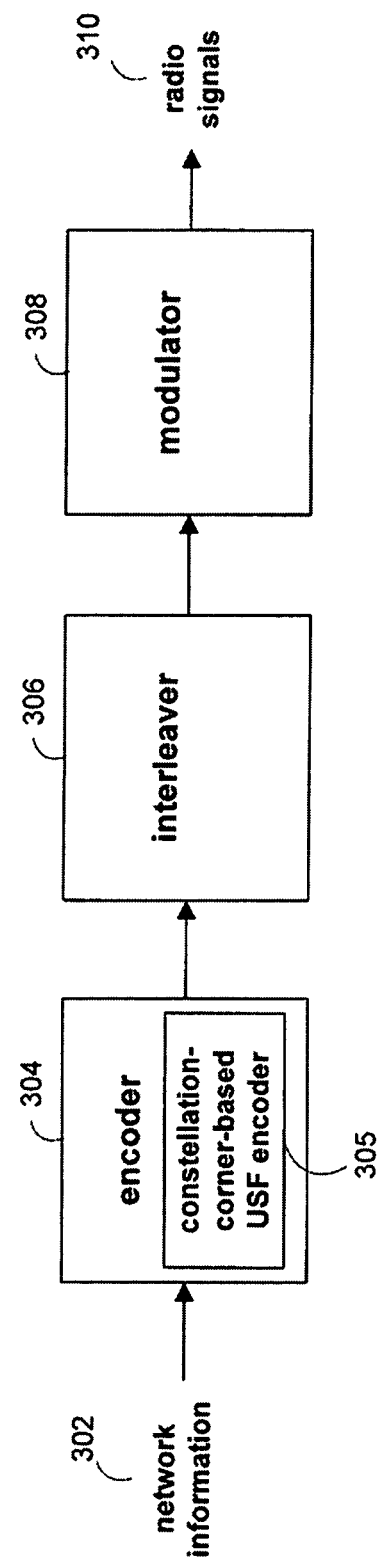
FIG. 3 is a simplified block diagram of an illustrative base station transmitter that can transmit the network information of FIG. 2, including constellation-corner-encoded USF information.

FIG. 3 shows a simplified block diagram of illustrative base station transmitter 300 that may be operable to transmit network information 302. Base station transmitter 300 may be a more detailed representation of a portion of base station 102 in FIG. 1. Network information 302 may include any of the information described above for network information 200 of FIG. 2, including a three-bit USF (e.g., USF 206). Base station transmitter 300 can include encoder 304, interleaver 306, and modulator 308.

Encoder 304 may encode network information 302 based on any suitable encoding scheme to produce encoded network information. For example, encoder 304 may encode network information 302 using the Turbo code specified by the EGPRS2-A DL or EGPRS2-B DL protocol. Encoder 304 may convert network information 302 into a block of symbols, where each symbol in the block can be of size M bits. Here, M can be any suitable positive integer (e.g., 2, 3, 4, 5, etc.). Thus, each symbol produced by encoder 304 may take on one of $2^M$ symbol values (e.g., 4, 8, 16, 32, etc.). The symbols in a block may be assembled into a plurality of groups, referred to as bursts, that are transmitted in separate downlink transmissions. For example, for EGPRS2-A DL, one packet of network information 302 may be converted into a block with four bursts of 148 symbols each.

In some embodiments, encoder 304 may include USF encoder 305 to encode the USF bits in network information 302. USF encoder 305 may have similar features and functionalities as USF encoder 103 of FIG. 1. The resulting encoded USF symbols produced by USF encoder 305 may be spread across the different bursts. For example, USF encoder 305 may convert a three-bit USF into twelve symbols, where each of the four bursts of a block may include three of the twelve encoded USF symbols.

USF encoder 305 of encoder 304 may encode the USF bits within network information 302 based on a codebook. The codebook for USF encoder 305 may specify all of the different possible USF codewords that can be generated by USF encoder 305. In particular, the codebook can specify the combination of resulting USF encoded symbols for each possible combination of USF bits. The codebook can be represented in a table format, as illustrated by Table 1A of FIG. 4A, Table 1B of FIG. 4B, Table 2A of FIG. 5A, and Table 2B of FIG. 5B. Table 1A shows the encoding scheme of illustrative codebook 400 that converts 3-bit USFs into 12-symbol USF codewords spread across four bursts as may be used in RED HOT A LSR transmissions, for example, and Table 1B shows the encoding scheme of illustrative codebook 450 that converts 3-bit USFs into 16-symbol USF codewords spread across four bursts as may be used in RED HOT B HSR transmissions, for example. Table 2A shows the encoding scheme of illustrative codebook 500 that converts 3-bit USFs into 12-symbol USF codewords as may be used in EGPRS2-A LSR transmissions, for example, and Table 2B shows the encoding scheme of illustrative codebook 550 that converts 3-bit USFs into 16-symbol USF codewords as may be used in EGPRS2-B HSR transmissions, for example.

Each row of Tables 1A, 1B, 2A, and 2B denotes the USF codeword for one of the eight possible USF values (e.g., from "000" to "111"). For example, the first row of each table shows the resulting three or four encoded USF symbols for each burst produced by USF encoder 305 when the USF value is "000," and the second row shows the encoded USF symbols when the USF value is "001." Each symbol of each USF codeword in these codebooks can take on an M-bit symbol value. Although each symbol value may actually have M binary bits (e.g., 4 bits, 5 bits, etc.), in Tables 1A, 1B, 2A, and 2B, the different symbol values used by USF encoder 305 are represented by decimal values—that is, 0, 1, 2, or 3. This representation is merely to prevent from overcomplicating the tables with showing full M-bit symbol values.

Codebooks 400, 450, and 550 (FIGS. 4A, 4B, and 5B) produce encoded USF symbols using only one of two symbol values for each encoded USF symbol. That is, all of the symbol entries in Tables 1A, 1B, and 2B are one of two decimals, e.g., 0 or 1. If M=4, the one decimal in these tables may represent a "1111" symbol value and the zero decimal may represent a "0011" symbol value. Alternatively, the zero and one decimals may represent a different pair of symbol values. Because only two symbol values are used for USF encoding, the codebooks for the encoding schemes illustrated by Tables 1A, 1B, and 2B may sometimes be referred to as binary codebooks.

As illustrated by FIG. 5A, in some embodiments, USF encoder 305 may employ a non-binary codebook. Codebook 500 of FIG. 5A can specify USF codewords with symbols drawn from four different symbol values instead of just two. These four different symbol values are represented in Table 2A by four different decimals, e.g., 0, 1, 2, and 3. In some embodiments, if M=4, the zero decimal in Table 3A can represent a "0011" symbol value, the one decimal can represent a "0111" symbol value, the two decimal can represent a "1111" symbol value, and the three decimal can represent a "1011" symbol value. These symbol values, however, are merely illustrative, and codebook 500 can be based on a different set of four symbol values.

Tables 1A, 1B, 2A, and 2B use only two or four different symbol values, even though a greater number of symbol values may be available for use by encoder 304. That is, codebooks 400, 450, 500 and 550 may use only a subset of the available M-bit symbol values. This subset of symbol values may include some or all of the symbol values that are associated with corner signal points or signal points that are adjacent to the corners of a signal constellation set used to generate radio signals 310. The different subsets of symbol values that can be used by USF encoder 305 and its codebooks will be described below in connection with FIGS. 7A, 7B, 8A, and 8B.

It should be understood that the codebooks of FIGS. 4A, 4B, 5A, and 5B are merely illustrative. In other embodiments, for example, the symbols in each USF codeword may be selected from a different number of symbol values (e.g., 8 symbol values, etc.), or the particular decimals in these tables may be adjusted/modified.

While USF encoder 305 may encode the USF of network information 302 using a subset of the available $2^M$ symbols values, overall, encoder 304 may encode network information 302 based on any or all of the $2^M$ available symbol values. For example, encoder 304 may encode the remaining segments of network information 302 (e.g., the RLC/MAC header or the data) using any of the available $2^M$ symbol values.

USF encoder 305 may implement a codebook, such as codebook 400 (FIG. 4A), codebook 450 (FIG. 4B), codebook 500 (FIG. 5A), or codebook 550 (FIG. 5B), using any suitable approach. In some embodiments, USF encoder 305 may include a lookup table that stores the combination of symbols for each possible combination of USF bits (e.g., each row of Tables 1A, 1B, 2A, and/or 2B) and is addressed by the USF bits. The lookup table may be any suitable type of memory device, such as a ROM or RAM. In these embodiments, encoder 304 may include an input interface that obtains the USF from network information 302 and computational circuitry that interfaces with the lookup table to obtain and compute/output the appropriate USF codeword for the current USF. The computational logic may be any suitable type or combination of hardware-based, firmware-based, and software-based logic. In other embodiments, encoder 305 may implement a codebook using general logic elements, such as combinational logic and registers.

Returning to FIG. 3, the encoded symbols produced by encoder 304, including the encoded USF symbols produced by USF encoder 305, may be interleaved by interleaver 306. For example, interleaver 306 may swap the ordering of the symbols such that neighboring encoded USF symbols may be separated from one another, or some of the encoded USF symbols may be moved to different bursts. In some embodiments, the encoded USF symbols may be spread evenly into different bursts because of the interleaving performed by interleaver 306.

Interleaver 306 may also place the encoded USF symbols into particular symbol positions within each burst. For example, Table 3A of FIG. 6A provides illustrative symbol positions that may be used for different RED HOT implementations, and Table 3B of FIG. 6B provides illustrative symbol positions that may be used for different EGPRS2 DL implementation. Referring first to Table 3A of FIG. 6A, the first row represents the symbol positions of the encoded USF symbols for each burst when base station transmitter 300 implements RED HOT A with 12-symbol USF encoding. Each burst of a RED HOT A transmission may include 148 symbols, and each position may be referred to by a symbol position from 0 to 147. Thus, the first row of Table 3 shows that interleaver 306 may position the three encoded USF symbols in each burst at symbols positions 59, 60, and 88 of the burst.

The second and third rows of Table 3A in FIG. 6A illustrate symbol positions for the RED HOT B protocol. A burst of a RED HOT B transmission may include 177 symbols. Thus, as illustrated in the second row of Table 3A, the symbol positions of the three encoded USF symbols when 12-symbol encoding is used may be at positions 70, 71, and 103. As illustrated in the third row of Table 3, the symbol positions of the four encoded USF symbols when 16-symbol encoding is used may be positions 70, 71, 103, and 104.

Referring now to the EGPRS2 DL example of Table 3B in FIG. 6B, the first row of Table 3B of FIG. 6B represents the symbol positions of the encoded USF symbols for each burst when base station transmitter 300 implements EGPRS2-A DL with 12-symbol USF encoding. Each burst of a EGPRS2-A DL transmission may include 148 symbols, and each position in the burst may be referred to by a symbol position from 0 to 147. Thus, the first row of Table 3 shows that, in one embodiment, interleaver 306 may position the three encoded USF symbols in each burst at symbols positions 87, 88, and 89 of the burst.

The second row of Table 3B in FIG. 6A illustrates symbol positions for the EGPRS2-B DL protocol with 16-symbol USF encoding. A burst of a EGPRS2-B DL transmission may include 177 symbols. Thus, the USF symbol positions of the four encoded USF symbols may be positions 104, 105, 106, and 107 when base station transmitter 300 implements a EGPRS2-B DL protocol.

It should be understood that the symbol positions illustrated in Table 3A and 3B are merely illustrative, and that any other suitable positions may be utilized in various embodiments of interleaver 306. In other embodiments, base station transmitter 300 may not include an interleaver at all.

Referring again to FIG. 3, base station transmitter 300 can include modulator 308. Modulator 308 can convert the interleaved symbols produced by interleaver 306 into radio signals 310 suitable for downlink transmission. Modulator 308 may operate using any suitable modulation scheme, such as any of those supported by the EGPRS2 DL protocol. In some embodiments, modulator 308 may modulate symbols using quadrature amplitude modulation (QAM) or phase shift keying (PSK). For example, for EGPRS2-A DL, modulator 308 can modulate the interleaved symbols based on 16QAM, 32QAM, GMSK, or 8PSK, and for EGPRS2-B DL, modulator 308 can modulate based on 16QAM, 32QAM, 8PSK, or QPSK. The size or dimension of the modulation scheme used by modulator 308 may correspond to the symbol-size, M. For instance, if M=4, modulator 308 may use a modulation scheme with $2^M=16$ signal constellation points (e.g., 16QAM).

As described above, USF encoder 305 may produce USF codewords that are made up of symbols that have symbol values selected from a subset of the $2^M$ available symbol values. Therefore, modulator 308 modulates the encoded and interleaved USF symbols using a subset of the available signal constellation points in the signal constellation set of the implemented modulation scheme. In some embodiments, the subset of symbol values that are used to generate all of the encoded USF symbols may correspond to corner signal constellation points in the signal constellation set. Examples of such embodiments are described below in connection with FIGS. 7A and 8A. In other embodiments, the subset of symbol values that are used to generate all of the encoded USF symbols may correspond to signal constellation points that are adjacent to the corners of the signal constellation set. Examples of these other embodiments are described below in connection with FIGS. 7B and 8B. Since the selected symbol values generated by USF encoder 305 and modulated by modulator 308 are based on corner or nearly corner positions of a signal constellation set, the encoding scheme used by base station transmitter 300 (and more particular USF encoder 305) may be referred to as a constellation-corner-based encoding scheme.

Figure 7A:
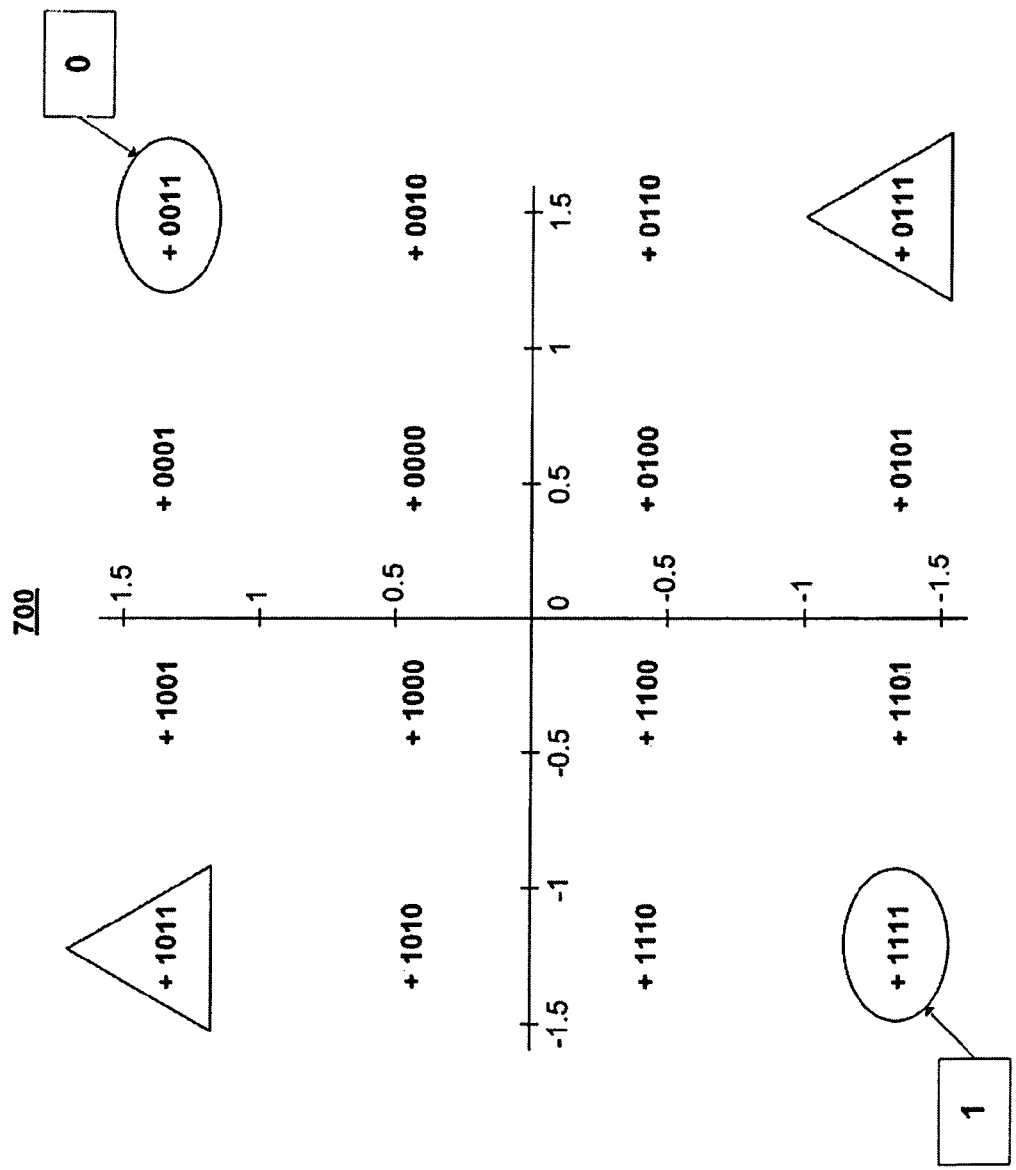
FIG. 7A is a 16QAM signal constellation set showing various illustrative symbol values that can be used to transmit the encoded USF symbols in accordance with various embodiments of the present invention.
Figure 7B:
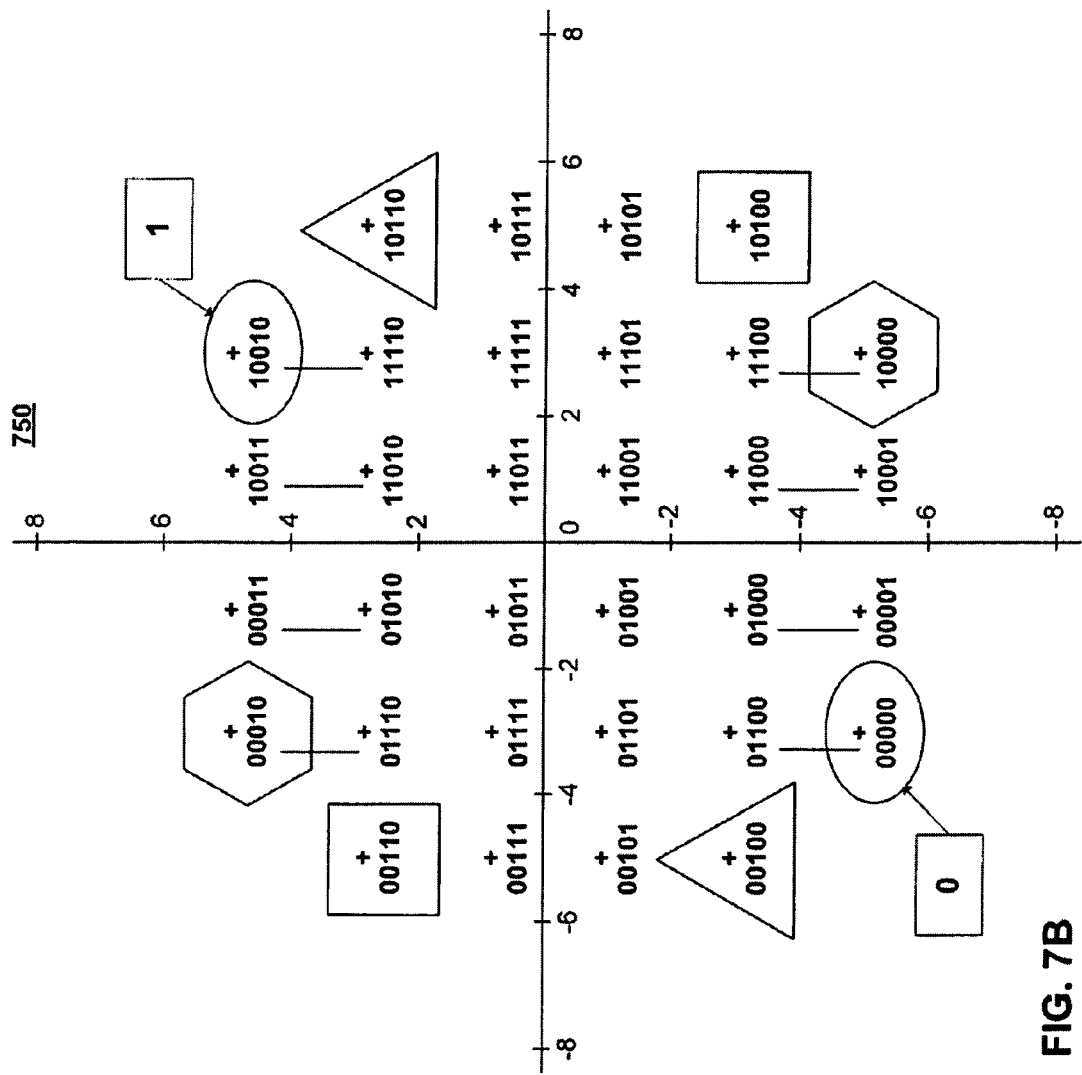
FIG. 7B is a 32QAM signal constellation set showing various illustrative symbol values that can be used to transmit the encoded USF symbols in accordance with various embodiments of the present invention.

FIGS. 7A and 7B illustrate QAM signal constellation sets of two QAM modulation schemes that can be implemented by modulator 308, as well as the signal points that can be used to transmit a USF codeword when a USF encoder 305 employs a binary codebook. These figures will be described with reference to the components of base station transmitter 300 of FIG. 3 (e.g., modulator 308, USF encoder 305). Referring first to FIG. 7A, signal constellation set 700 is shown for a QAM modulation scheme, where M=4 (e.g., a 16QAM modulation scheme). This 16QAM signal constellation set may be implemented by modulator 308 in the EGPRS2-B DL protocol or in either RED HOT implementations. Each signal point in signal constellation set 700 (or the signal constellation sets in FIGS. 7B, 8A, and 8B) may be associated with a particular M-bit symbol. In particular, in FIG. 7A, signal constellation set 700 includes 16 signal constellation points, where each signal point is associated with a different four-bit symbol. Signal constellation set 700 may be illustrated in a complex number plane, where each signal point and associated symbol value is represented by a "+" in the complex number plane. In the complex number plane, the horizontal axis is the real axis and the vertical axis is the imaginary axis. Thus, the signal points in signal constellation set 700 can illustrate the magnitude and phase that radio signals 310 may take on when modulator 308 transmits different symbol values.

As described above, modulator 308 may select corner signal points in a signal constellation set for use in modulating a USF codeword. For example, when USF encoder 305 employs a binary codebook, the two symbol values used in each USF codeword may be "0011" and "1111," which correspond to the upper-right corner and lower-left corner signal points, respectively, of 16QAM signal constellation set 700. The corresponding signal points in signal constellation set 700 are circled for emphasis. Continuing this example, if USF encoder 305 operates based on the binary codebook defined by Tables 1A, 1B, or 2B of FIGS. 4A, 4B, and 5B, each zero decimal in these tables can represent the "0011" symbol value, and each one decimal can represent the "1111" symbol value. In other embodiments where a binary codebook is used, modulator 308 may use the other two corner signal points in signal constellation set 700—that is, the upper-left signal point corresponding to symbol value "1011" and the lower-right signal point corresponding to symbol value "0111"—to, for example, represent each one entry and zero entry in Tables 1 and 2. These two signal points are surrounded by triangles for emphasis.

Referring now to FIG. 7B, signal constellation set 750 is shown for a 32QAM scheme, which is another modulation scheme that may be implemented by modulator 308. FIG. 7B illustrates signal points that may be selected when a 32QAM scheme and a binary codebook are used. Signal constellation set 750 of FIG. 7B can include 32 signal constellation points that are each associated with a 5-bit symbol value. As described above, modulator 308 may select signal points that are adjacent to the corners of a signal constellation set (e.g., set 750) to use in transmitting USF symbols. Signal points that are adjacent to corners may be used for constellation sets, such as signal constellation set 750, where the structure of the set is such that the corners themselves do not correspond to any signal points. One possible subset of signal points in signal constellation set 750 that may be used by modulator 308 when USF encoder 305 employs a binary codebook corresponds to signal values of "00000" and "10010."These two signal points are circled in FIG. 7B for emphasis and are adjacent (in a counter-clockwise direction) to the lower-left and upper-right corners of signal constellation set 750, respectively. Thus, USF encoder 305 may generate a set of encoded USF symbols using only symbol values "00000" and "10010." For example, if USF encoder 305 operates based on the codebook of Tables 1A, 1B, or 2B of FIGS. 4A, 4B, and 5B, each zero decimal may represent a "00000" symbol value and each one decimal may represent a "10010" symbol value (or vice versa). Different pairs of symbol values located adjacent to facing corners may be used instead by modulator 308 when USF encoder employs a binary codebook. Each such pair is surrounded by the same shape (e.g., circle, square, hexagon, or triangle) in FIG. 7B.

Figure 8A:
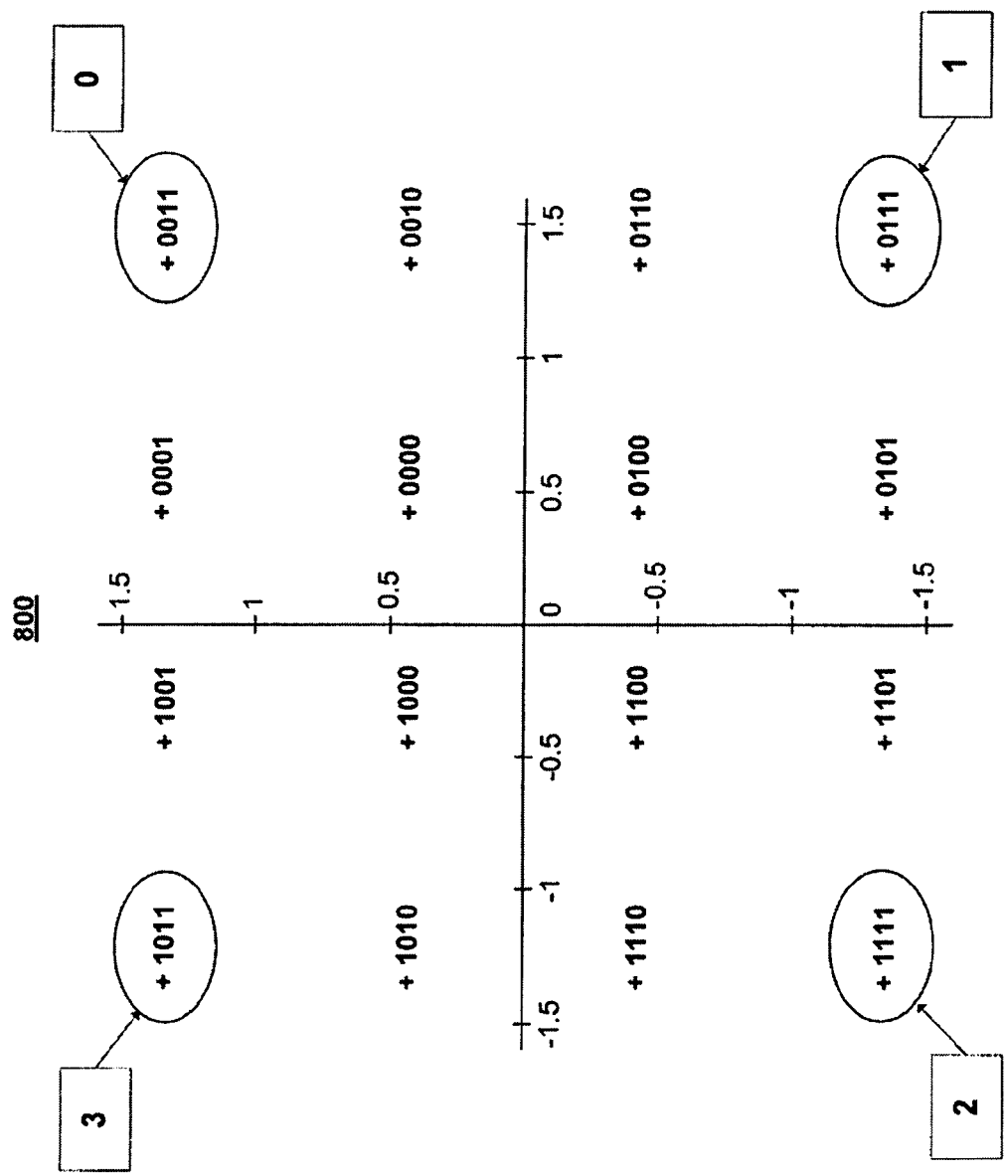
FIG. 8A is a 16QAM signal constellation set showing various illustrative symbol values that can be used to transmit the encoded USF symbols in accordance with various embodiments of the present invention.

Constellation-corner-based encoding can be used in encoder implementations that operate using non-binary codebooks. For example, rather than selecting only two corner or nearly corner signal points in constellation sets 700 and 750, additional signal points may also be included in the encoding scheme. FIG. 8A shows signal constellation set 800 that, like set 700 of FIG. 7A, is a 16QAM constellation set. However, FIG. 8A is intended to illustrate constellation-corner-based encoding using four corner signal points. USF encoder 305 may produce USF codewords that are based on any of the circled symbol values. In some embodiments, these four symbol values may be used with EGPRS-A DL and codebook 500 of FIG. 5A, where each zero decimal in codebook 500 represents a "0011" symbol value, each one decimal represents a "0111" symbol value, each two decimal represents a "1111" symbol value, and each three decimal represents a "1011" symbol value, for example. In other embodiments, each decimal in codebook 500 may represent a different one of these four symbol values.

Figure 8B:
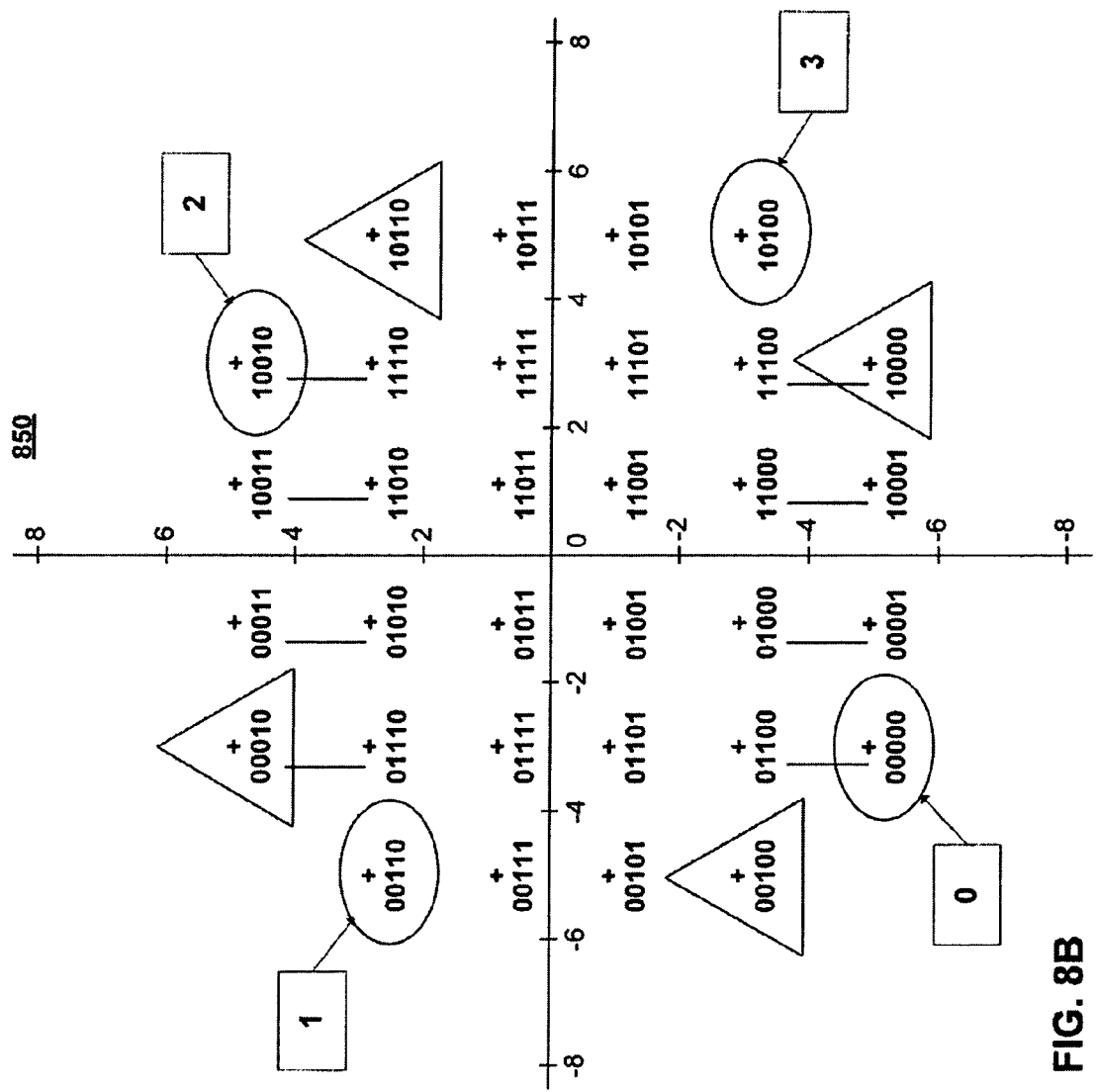
FIG. 8B is a 32QAM signal constellation set showing various illustrative symbol values that can be used to transmit the encoded USF symbols in accordance with various embodiments of the present invention.

Referring now to FIG. 8B, 32QAM signal constellation set 850 is shown that can illustrate constellation-corner-based encoding using four nearly-corner signal points. FIG. 8B may illustrate the encoding and modulation performed by USF encoder 305 and modulator 308, respectively, when the EGPRS-A protocol is implemented with a 32QAM modulation scheme. In some embodiments, USF encoder 305 may produce USF codewords using the symbol values that correspond to the circled signal constellation points in set 850. These circled signal constellation points are adjacent to the four corners of signal constellation set 850, where each of these circled points is shifted counter-clockwise from its respective corner. If a non-binary codebook such as codebook 500 of FIG. 5A is employed by USF encoder 305, each zero decimal in codebook 850 may represent a "00000" symbol value, each one decimal may represent a "00110" decimal, etc. However, this is merely illustrative and any other mapping may be used. Alternatively, USF encoder 305 and modulator 308 may operate using the four symbol values/signal points that are surrounded by triangles.

It should be understood that the constellation-corner-based encoding schemes described in connection with FIGS. 7A, 7B, 8A, and 8B are merely illustrative. For example, any other suitable modulation may be used, or any other combination and/or number of corner or nearly-corner constellation points may be used. Thus, it should be understood that the present invention is not limited to transmitting USF codewords using any particular subset of corner or adjacent-to-corner signal points, nor is the present invention limited to a subset of a particular size.

Note that, in each example of FIGS. 7A, 7B, 8A and 8B, a subset of signal points are chosen that have a relatively large Euclidean distance compared to the Euclidean distance between other pairs of signal points. This may be true for any similar constellation-corner based encoding scheme. The large Euclidean distance used to represent USF information may allow the downlink transmission of the USF information to be more reliably transmitted. In particular, the large Euclidean distance may provide an increased resiliency to any noise that might occur during downlink transmission, since a greater amount of noise would be needed to cause a mobile station (e.g., mobile stations 104 and 106 of FIG. 1) to mistake one corner or adjacent-to-corner signal point for a signal point in an entirely different corner. In some of the scenarios, the corner or adjacent-to-corner signal points used by modulator 308 (FIG. 3) may be signal points that are located at antipodal locations in the signal constellation set. Antipodal signal points refer to signal points in a signal constellation set for a particular modulation scheme that are separated by the maximum Euclidean distance possible in that modulation scheme.

Figure 9:
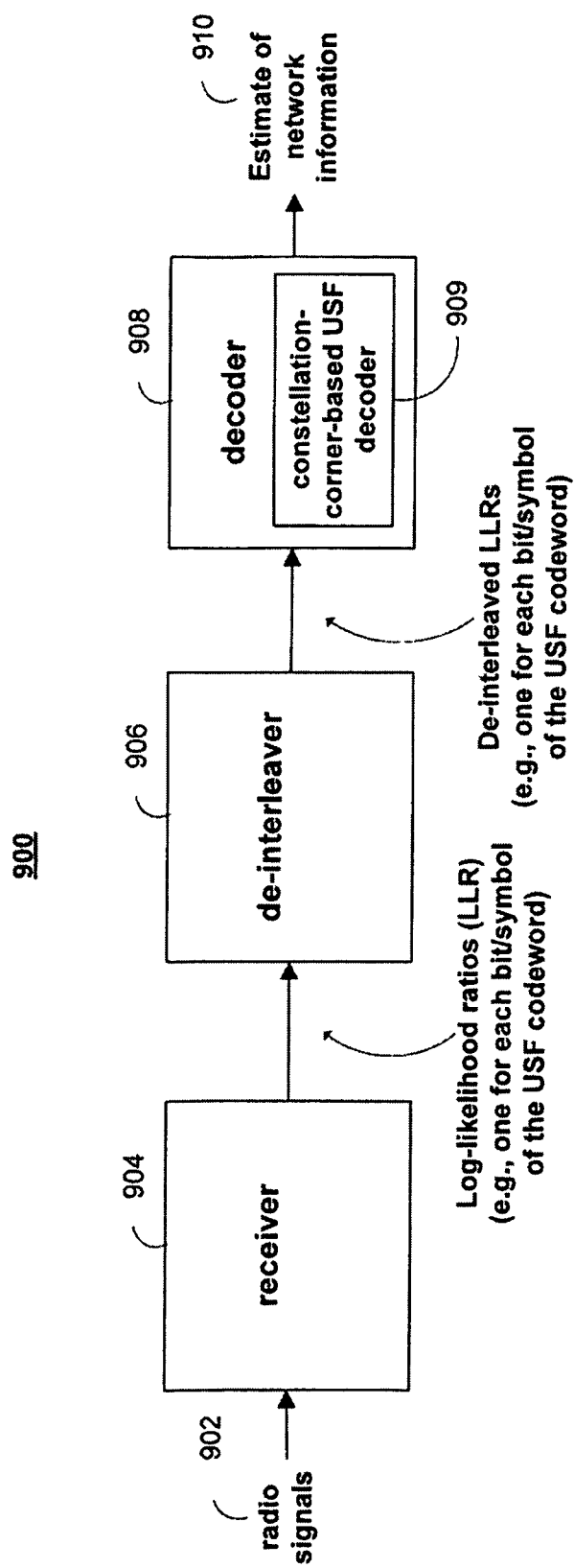
FIG. 9 is a simplified block diagram of a mobile station receiver.

Radio signals 310 produced by modulator 308 may represent a data burst from base station transmitter 300 at each time interval, and may be transmitted on a downlink transmission to one or more mobile stations. FIG. 9 shows a block diagram of illustrative mobile station receiver 900 that may be operable to receive and interpret radio signals 902. In some embodiments, radio signals 902 may be the same or similar to radio signals 310 (FIG. 3) transmitted from base station transmitter 300, and mobile station receiver 900 may be a more detailed representation of a portion of mobile station 104 or mobile station 106 of FIG. 1. Mobile station receiver 900 can include receiver 904, de-interleaver 906, and decoder 908. The operation of these components of may correspond to the operation of modulator 308, interleaver 306, and encoder 304 of FIG. 3, respectively, where each component of mobile station receiver 900 can essentially undo the processing of its corresponding base station component.

In particular, receiver 904 can receive radio signals 902 from a channel (e.g., a radio channel of a particular frequency) that corresponds to a burst of information for a current block. Receiver 904 may have any necessary components to interpret radio signals 902 and can make an estimate of the bits and/or symbols that correspond to radio signals 902. For example, receiver 904 may include an equalizer, a demodulator and a quantizer that operate based on the modulation scheme used by the corresponding base station modulator (e.g., modulator 308 of FIG. 3). The modulation scheme may be, for example, 16QAM, 32QAM, GMSK, or 8PSK. Receiver 904 can produce estimates of the transmitted M-bit encoded symbols as hard information (e.g., hard groups of ones and zeros) or soft information (e.g., in the form of log-likelihood ratios (LLRs)). For example, receiver 904 can produce an LLR for each bit or each M-bit symbol received in radio signals 902.

The bit-level or Mbit symbol-level estimates produced by receiver 904 may be processed by de-interleaver 906. De-interleaver 906 may reverse the interleaving function performed by, for example, interleaver 306 of FIG. 3, thereby returning the interleaved symbols to their original ordering. For instance, de-interleaver 906 may change the symbol positions of the received symbols into the positions expected by decoder 908. This may produce, for example, LLRs for each bit or symbol of the USF codeword in the original order. Decoder 908 may then decode the bit-level or symbol-level estimates of the received symbols into estimate 910 of the network information (e.g., network information 200 of FIG. 2). To obtain estimate 910, decoder 908 may be an error correcting code (ECC) decoder (e.g., convolutional code decoder) that operates using the same or a compatible ECC code as that of, for example, encoder 304 of FIG. 3.

Decoder 908 can include USF decoder 909 to compute an estimate of the transmitted USF. USF decoder 909 may use the same codebook as that of the base station to store and/or obtain the bit estimate of the original USF (e.g., the codebook of Tables 1A, 1B, 2A and 2B of FIGS. 4A, 4B, 5A, and 5). For example, to compute a USF estimate, USF decoder 909 may match the hard or soft information produced by de-interleaver 906 with the USF codewords in the codebook. Since each USF codeword is associated with a particular USF, USF decoder 909 may identify the USF that corresponds to the USF codeword that most likely matches the hard or soft information, and can use the identified USF as the USF estimate.

As described above, the codebook used by USF decoder 909 may include only symbols with symbol values that correspond to corner signal points or to signal points that are adjacent to the corners in a QAM signal constellation set. Thus, because these corner or adjacent-to-corner signal points may be separated by a relatively large Euclidean distance compared to other possible signal point pairs in the modulation scheme, USF decoder 909 can more reliably interpret the true symbol value of each symbol in the USF codeword. If mobile station receiver 900 successfully receives and interprets the current received block, the USF estimate within estimate 910 of network information may match the original USF that was transmitted by the base station. Mobile station receiver 900 can then determine from the USF estimate whether mobile station receiver 900 may be scheduled to transmit information on one or more next uplink time periods. To make this determination, mobile station receiver 900 may perform the steps described below in connection with FIG. 11.

Figure 10:
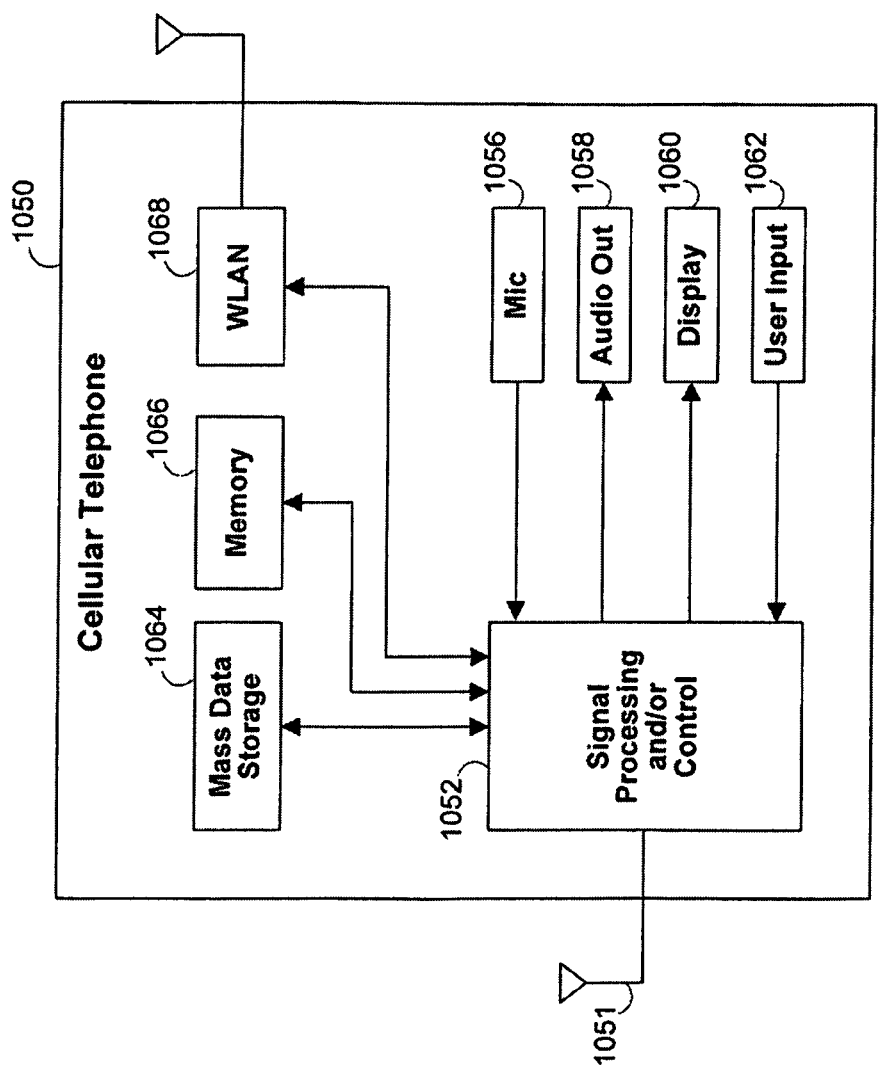
FIG. 10 is a block diagram of an illustrative cellular telephone that can employ the disclosed technology.

A mobile station receiver, such as mobile station receiver 900 of FIG. 9, may be implemented as part of a cellular telephone. For example, referring now to FIG. 10, the present invention can be implemented in cellular telephone 1050 that may include a cellular antenna 1051. The present invention may implement either or both signal processing and/or control circuits, which are generally identified in FIG. 10 at 1052, a WLAN interface 1068 and/or mass data storage 1064 of the cellular telephone 1050. In some implementations, the cellular telephone 1050 includes a microphone 1056, an audio output 1058 such as a speaker and/or audio output jack, a display 1060 and/or an input device 1062 such as a keypad, pointing device, voice actuation and/or other input device.

The signal processing and/or control circuits 1052 and/or other circuits (not shown) in the cellular telephone 1050 may include a modem (not shown) coupled to cellular antenna 1051 to receive and demodulate incoming data, including USF data and the like, using the methods described above. Signal processing and/or control circuits 1052 may also process data, perform coding and/or encryption, perform calculations, format data and/or perform other cellular telephone functions. Signal processing and/or control circuits 1052 may include a single processor, or may include several processors each of which is configured to perform one or more cellular telephone functions. For example, signal processing and/or control circuits 1052 may include a modem processor and an application processor. The processors may be hardware, software, or firmware-based processors.

Figure 11:
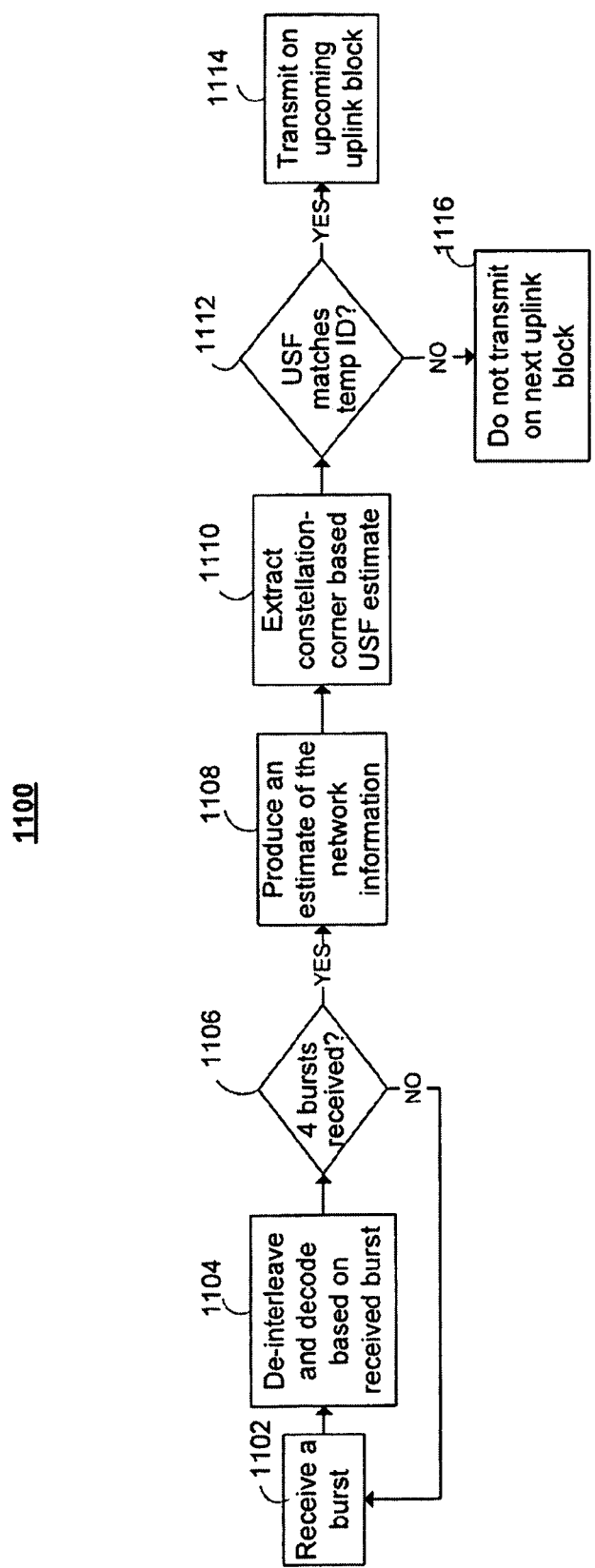
FIG. 11 is a flow diagram of an illustrative process for decoding received network information, including a USF, and transmitting data on an upcoming uplink time period based on the USF.

FIG. 11 shows a flow diagram of illustrative process 1100 that a mobile station can perform to transmit information based on USF information. Process 1100 may be performed by any suitable mobile station, such as mobile stations 104 or 106 of FIG. 1, cellular telephone 1050 of FIG. 10, or mobile station receiver 900 of FIG. 9. For example, process 1100 may be carried out using any computational logic or circuitry (e.g., signal processing and/or control circuits 1052 of FIG. 10) implemented on the mobile station. At step 1102, the mobile station can receive a radio signal that corresponds to a burst. The burst may be one of a plurality of bursts (e.g., four bursts) that together form a block of network information. The burst may include data that is intended for the mobile station or data that is intended for a different mobile station. At step 1104, the mobile station can process the burst by, for example, demodulating and de-interleaving the received burst. Then, at step 1106, the mobile station can determine whether all of the bursts for a current block have been received. If the current block includes four bursts, step 1106 can involve determining whether four bursts have been received. If all of the bursts for the current block have not been received, process 1100 may move back to step 1102, where the mobile station may receive the next burst in the current block. Process 1100 returns to step 1102 until all bursts for the current block have been received and processed.

If, at step 1106, the mobile station determines that all blocks for the current block (e.g., four bursts) have been received, process 1100 can move to step 1108. At step 1108, the mobile station can produce an estimate of the network information, including an estimate of the USF. For example, the mobile station can decode the bursts that were received and processed at steps 1102 and 1104. The USF may have been constellation-corner-encoded, and therefore step 1108 can involve decoding the encoded USF using constellation-corner-based decoding. From the estimate of the network information, at step 1110, the mobile station can extract the constellation-corner-based USF estimate, and at step 1112, can compare the USF estimate with the temporary identification associated with the mobile station. If, at step 1112, the mobile station determines that the USF estimate matches the mobile station's temporary identification, the mobile station may transmit data to the base station on an upcoming uplink block at step 1114. Otherwise, access to the next uplink block has been granted to a different mobile station, and at step 1116, the mobile station does not transmit data on the upcoming uplink block.

The foregoing describes systems and methods for encoding and decoding an uplink state flag (USF) using a constellation-corner-based encoding scheme. Those skilled in the art will appreciate that the invention can be practiced by other than the described embodiments, which are presented for the purpose of illustration rather than of limitation.

What is claimed is:

1. A mobile station for use on a cellular network, comprising:
    a receiver configured to:
        receive from the cellular network transmitted signals that include an encoded uplink state flag (USF);
        process the received signals to generate estimated symbol values corresponding to the received signals, wherein the estimated symbol values can correspond to any of the symbol values in a quadrature amplitude modulation (QAM) constellation set;
    a USF decoder employing a USF codebook having codewords that are defined by a subset of the symbol values in the QAM constellation set, the subset being selected from among symbol values that each correspond to a signal point located at or adjacent to a corner of the QAM constellation set, the USF decoder being configured to generate an estimated USF from the estimated symbol values based on a correspondence between the estimated symbol values and the codewords; and
    computational logic circuitry configured to determine whether to transmit data in a next uplink time period based on the estimated USF.

2. The mobile station of claim 1, wherein the QAM constellation set is a 16QAM constellation set that includes 16 signal points.

3. The mobile station of claim 1, wherein the QAM constellation set is a 32QAM constellation set that includes 32 signal points.

4. The mobile station of claim 1, wherein the transmitted signals correspond to interleaved symbols that are interleaved among a plurality of bursts, the mobile station further comprising:
   a de-interleaver configured to de-interleave the received interleaved symbols from among the plurality of bursts to produce de-interleaved symbols.

5. The mobile station of claim 4, wherein the USF decoder is configured to compute the estimate of the USF from the de-interleaved symbols.

6. The mobile station of claim 1, wherein the subset of symbol values corresponds to a pair of symbol values that are associated with signal points located at antipodal locations in the QAM constellation set.

7. The mobile station of claim 1, wherein the computational logic comprises at least one of hardware, software, and firmware logic.

8. The mobile station of claim 1, wherein the estimate of the USF is one of a predetermined number of possible USF values.

9. The mobile station of claim 8, wherein the predetermined number is eight, and wherein the USF decoder is configured to output one of the eight possible USF estimates.

10. A method for using uplink state flag (USF) information on a cellular network, the method comprising:
   receiving from the cellular network transmitted signals that include an encoded USF;
   processing the received signals to generate estimated symbol values corresponding to the received signals, wherein the estimated symbol values can correspond to any of the symbol values in a quadrature amplitude modulation (QAM) constellation set;
   generating an estimated USF from the estimated symbol values based on a correspondence between the estimated symbol values and codewords in a USF codebook, wherein the codewords are defined by a subset of the symbol values in the QAM constellation set, the subset being selected from among symbol values that each correspond to a signal point located at or adjacent to a corner of the QAM constellation set; and
   determining whether to transmit data in a next uplink time period based on the estimated USF.

11. The method of claim 10, wherein the processing comprises processing the received signals to generate estimated symbol values that can correspond to any of the symbol values in a 16QAM constellation set that includes 16 signal points, and wherein the generating comprises generating an estimated USF based on codewords defined by a subset of the symbol values in the 16QAM constellation set.

12. The method of claim 10, wherein the processing comprises processing the received signals to generate estimated symbol values that can correspond to any of the symbol values in a 32QAM constellation set that includes 32 signal points, and wherein the generating comprises generating an estimated USF based on codewords defined by a subset of the symbol values in the 32QAM constellation set.

13. The method of claim 10, wherein the transmitted signals correspond to interleaved symbols that are interleaved among a plurality of bursts, the method further comprising:
   de-interleaving the received interleaved symbols from among the plurality of bursts to produce de-interleaved symbols.

14. The method of claim 13 further comprising computing the estimate of the USF from the de-interleaved symbols.

15. The method of claim 10, wherein the generating comprises generating an estimated USF based on codewords defined by a pair of symbol values associated with signal points located at antipodal locations in the QAM constellation set.

16. The method of claim 10, wherein the generating comprises generating an estimated USF corresponding to one of a predetermined number of possible USF values.

17. The method of claim 10, wherein the generating comprises generating an estimated USF corresponding to one of eight possible USF values.

* * * * *